US010974178B2

(12) United States Patent
Batllo

(10) Patent No.: US 10,974,178 B2
(45) Date of Patent: Apr. 13, 2021

(54) FILTER FOR LIQUID OR VISCOUS PRODUCT AND SPRAYING INSTALLATION INCLUDING SUCH A FILTER

(71) Applicant: EXEL INDUSTRIES, Epernay (FR)

(72) Inventor: Benoît Batllo, Paris (FR)

(73) Assignee: EXEL INDUSTRIES, Epernay (FR)

( * ) Notice: Subject to any disclaimer, the term of this patent is extended or adjusted under 35 U.S.C. 154(b) by 0 days.

(21) Appl. No.: 16/775,124

(22) Filed: Jan. 28, 2020

(65) Prior Publication Data

US 2020/0246734 A1  Aug. 6, 2020

(30) Foreign Application Priority Data

Jan. 31, 2019 (FR) .................................. 1900962

(51) Int. Cl.
*B01D 35/147* (2006.01)
*B05B 15/40* (2018.01)
*B01D 29/11* (2006.01)
*B01D 35/02* (2006.01)
*B01D 35/157* (2006.01)
*F16K 11/085* (2006.01)
*F16K 11/087* (2006.01)

(52) U.S. Cl.
CPC .......... *B01D 35/147* (2013.01); *B01D 29/114* (2013.01); *B01D 35/02* (2013.01); *B01D 35/1573* (2013.01); *B05B 15/40* (2018.02); *B01D 2201/4061* (2013.01); *F16K 11/0856* (2013.01); *F16K 11/0873* (2013.01)

(58) Field of Classification Search
CPC .......... B01D 2201/4061; B01D 29/114; B01D 29/15; B01D 35/02; B01D 35/147; B01D 36/001; B05B 15/40; F16K 11/0856; F16K 11/0873
See application file for complete search history.

(56) References Cited

U.S. PATENT DOCUMENTS

| 2,602,697 | A | * | 7/1952 | Otto | .................. | E03C 1/046 |
| | | | | | | 422/282 |
| 2,604,446 | A | * | 7/1952 | Palmer | ............... | C02F 1/688 |
| | | | | | | 422/112 |
| 5,152,321 | A | | 10/1992 | Drager et al. | | |
| 5,931,196 | A | | 8/1999 | Bernardi et al. | | |
| 2012/0031821 | A1 | | 2/2012 | Swain | | |

FOREIGN PATENT DOCUMENTS

FR          2472707 A1       7/1981

OTHER PUBLICATIONS

INPI Rapport de Recherche Préliminaire for Patent Application No. FR 1900962, Sep. 11, 2019, 2 pp.

* cited by examiner

*Primary Examiner* — Terry K Cecil
(74) *Attorney, Agent, or Firm* — Soquel Group LLC

(57) ABSTRACT

A filter for a liquid for viscous product including a filtering element and a bucket defining a receiving volume accommodating the filtering element, the filter including a liquid or viscous product intake tubing and a liquid or viscous product discharge tubing, the filter including a valve configured to assume a first position, where the valve couples the intake tubing to the receiving volume and this receiving volume to the discharge tubing, and a second position, where the valve couples the intake tubing to the discharge tubing and isolates the receiving volume relative to the two tubings.

9 Claims, 8 Drawing Sheets

Figure 1:
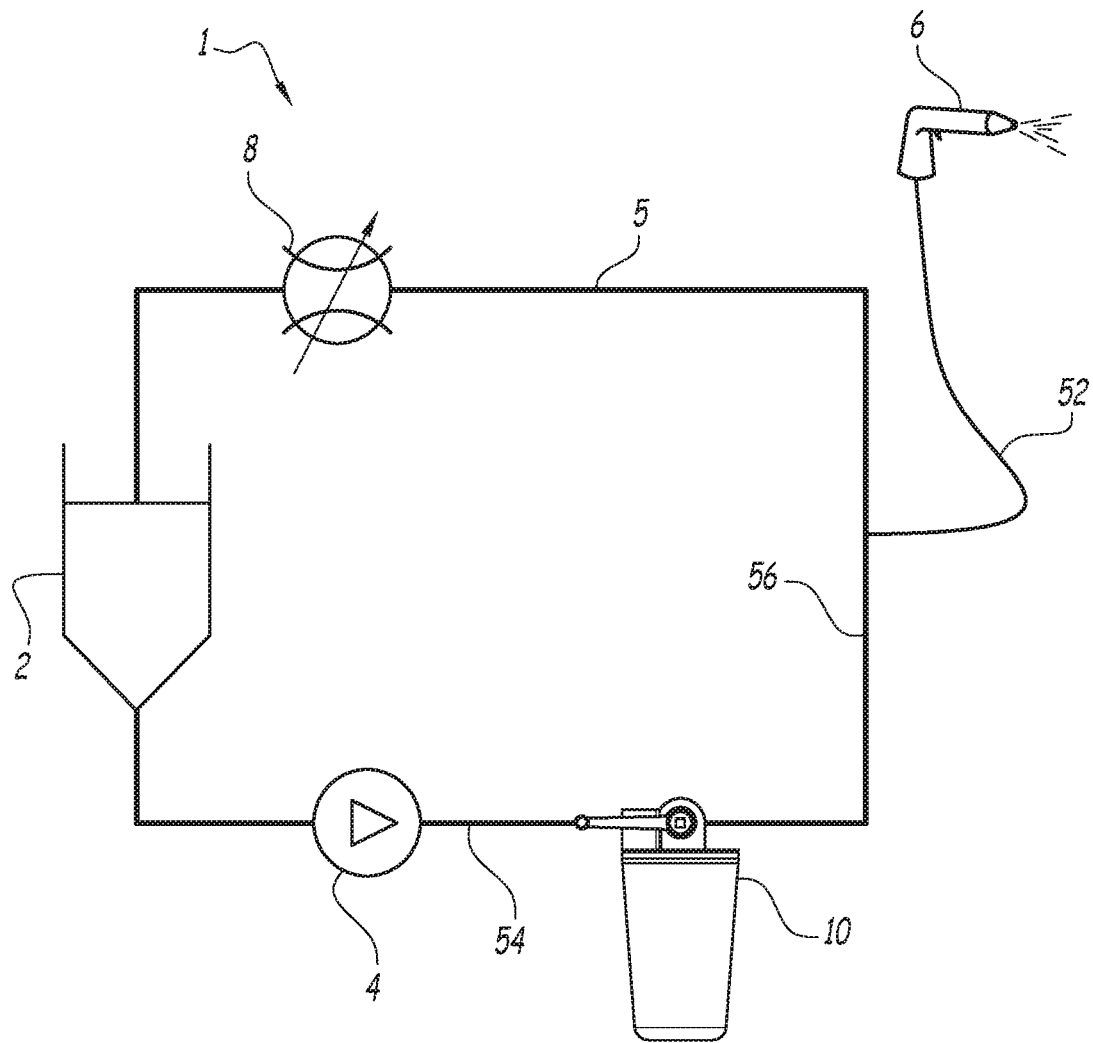

FILTER FOR LIQUID OR VISCOUS PRODUCT AND SPRAYING INSTALLATION INCLUDING SUCH A FILTER

CROSS-REFERENCE TO RELATED APPLICATION

This application claims priority of French Patent Application No. 19 00962, filed on Jan. 31, 2019.

FIELD OF THE INVENTION

The present invention relates to a filter for a liquid or viscous product. This filter comprises a filtering element and a bucket defining a receiving volume accommodating the filtering element, as well as an intake tubing and a discharge tubing for the liquid or viscous product.

BACKGROUND OF THE INVENTION

In the field of installations including distribution circuits for liquid or viscous products comprising filters, a bypass circuit can be placed in order to ensure the service continuity of an installation during a change of filtering element. Several methods of changing a filtering element are known; each method has advantages and drawbacks. The major drawbacks are in particular the high price, for example in the case of a bypass circuit using two filter bodies and four valves, or the risk of pollution, for example the case of a bypass circuit with no filter body, using a simple pipe where the liquid or viscous product can deteriorate between two uses.

It is known from US-A-2012031821 to produce a filter for a liquid product that comprises a valve configured to assume two positions. In the first position, the valve couples an intake tubing to a receiving volume of a filtering element and this receiving volume to a discharge tubing. In the second position, the valve couples the intake and discharge tubings to one another and isolates the receiving volume with respect to these tubings. This filter is complex to produce and includes many liquid retention areas.

The invention more particularly aims to resolve these problems, by proposing a new filter that is more cost-effective and easier to manipulate.

SUMMARY OF THE DESCRIPTION

To that end, the invention relates to a filter of the aforementioned type, wherein the valve includes two cylindrical or spherical sliding gates, including a first cylindrical or spherical sliding gate coupling the intake tubing to the receiving volume of the filtering element, when the valve is in its first position, and delimiting a dead line, when the valve is in its second position, and a second cylindrical or spherical sliding gate coupling the receiving volume to the discharge tubing, when the valve is in its second position, and coupling the intake tubing to the discharge tubing, when the valve is in its second position.

Owing to the invention, changing the filtering element is simple and cost-effective. The filter involves a limited number of parts, which also makes the manipulations to change filtering elements economically advantageous. The valve is able to switch from one position to the other, thus modifying the path traveled by the liquid or viscous product. The liquid or viscous product is filtered by the filtering element inside the bucket when the valve is in its first position. The second position of the valve serves to create a bypass circuit, making it possible to isolate the receiving volume with respect to the tubings, without creating too many or excessively large retention zones, which makes it possible to disassemble the bucket and access the filtering element to replace it, without stopping the installation. The continuity of service is thus ensured.

According to advantageous but optional aspects of the invention, such a filter may incorporate one or more of the following features, considered in any technically allowable combination:

- The valve includes at least one cylindrical or spherical sliding gate.
- The filter includes at least one air intake orifice and one purge orifice.
- At least one spherical sliding gate includes a slot for placing the receiving volume in communication with the one air intake orifice when the valve is in its second position.
- The filter includes a member for manually controlling the position of the valve.
- The valve is movable between its first position and its second position, and reciprocally, by a rotation, the amplitude of which is preferably equal to 90°, around a pivot axis defined by a body of the valve.
- The valve is integrated into a head mounted removably on the bucket.
- The filtering element is a cylindrical cartridge mounted removably on the head.

The invention also relates to a spraying installation including a tank of liquid or viscous product, a pump and a sprayer, as well as a filter for liquid or viscous product as previously disclosed.

BRIEF DESCRIPTION OF THE DRAWINGS

The invention will be better understood, and other advantages thereof will appear more clearly, in light of the following description of one embodiment of a filter and a spraying installation according to its principle, provided solely as a non-limiting example and done in reference to the appended drawings, in which:

FIG. 1 is a diagram showing an exemplary installation in a paint circulation circuit known as paint "circulating", which supplies at least one spraying station for liquid product according to the invention;

FIG. 2 is a perspective view of a filter of the installation of FIG. 1, a valve of this filter being in a first position;

FIG. 3 is a sectional view of the filter on a larger scale, along plane III of FIG. 2;

FIG. 4 is a sectional view of the filter on the same scale as FIG. 3, along plane IV of FIG. 2;

FIG. 5 is a sectional view of an upper part of the filter along plane V of FIG. 2;

FIG. 6 is a sectional view of the filter similar to FIG. 3, also along the plane III, when the valve is in a second position;

FIG. 7 is a sectional view of the filter similar to FIG. 4, also along the plane IV, when the valve is in the second position; and FIG. 8 is a partial sectional view of the filter similar to FIG. 5, also along the plane V, when the valve is in the second position.

To facilitate the navigation from one figure to another, an orthonormal coordinate system X-Y-Z is shown in FIGS. 2-8.

DETAILED DESCRIPTION

FIG. 1 shows an installation 1 for spraying liquid product including a tank 2 of liquid product, a pump 4 and a sprayer 6. In practice, installation 1 may include several other sprayers, which are not shown, for clarity of the drawing. Optionally, installation 1 also includes a pressure regulator 8. Tank 2, pump 4, sprayer 6 and, if applicable, pressure regulator 8 are coupled by an assembly 5 of pipes suitable for conveying the liquid product between the components of the installation.

The liquid product is for example a coating product, such as paint or varnish.

Sprayer 6 may be of the pneumatic or "airless" type, and may or may not be electrostatic. It may be a manual gun, as shown in FIG. 1, or in a variant, an automatic sprayer, known in itself.

Installation 1 additionally includes a filter 10 for a liquid product, as disclosed hereinafter. This filter is intercalated, in assembly of pipes 5, between tank 2 and a tapping 52 of assembly 5 dedicated to the supply of sprayer 6.

Here, filter 10 is downstream from pump 4. It can, however, be positioned upstream from the latter.

Reference 54 denotes the portion of assembly of pipes 5 located immediately upstream from filter 10. Reference 56 denotes the portion of this assembly located immediately downstream from this filter. Filter 10 is inserted between portions 54 and 56 of assembly of pipes 5.

Filter 10 is shown alone in FIGS. 2-8. Filter 10 includes a bucket 12, defining a receiving volume V12, and a filtering element 14 housed in receiving volume V12. In practice, filtering element 14 is a rigid or partially rigid cylindrical filtering cartridge. Filtering element 14, for example, includes a disc-shaped rigid bottom 14A and a framework, not shown, while a canvas 14B of the cylindrical cartridge is made from a flexible and porous material. The material of canvas 14B may be natural or synthetic, depending on the nature of the liquid product to be filtered. It may, for example, be stainless steel, polymer or cellulose.

Bucket 12 is made from a material that accounts for the nature of the liquid product that must pass through the filtering element. In the example of the figures, where it involves a coating product, the bucket is made from metal, preferably stainless steel. For example, it has a fixed capacity of between one and two liters.

Filter 10 also includes a valve 20 integrated into a head 22.

The bucket is assembled reversibly with head 22. For example, components 12 and 22 can be screwed together, snapped or assembled by a mechanism of the bayonet type or with flanges.

Filtering element 14 is in turn removably attached on lower face 221 of head 22, and is held by a mechanical fastening system, for example with screws, clip, etc.

Figure 2:
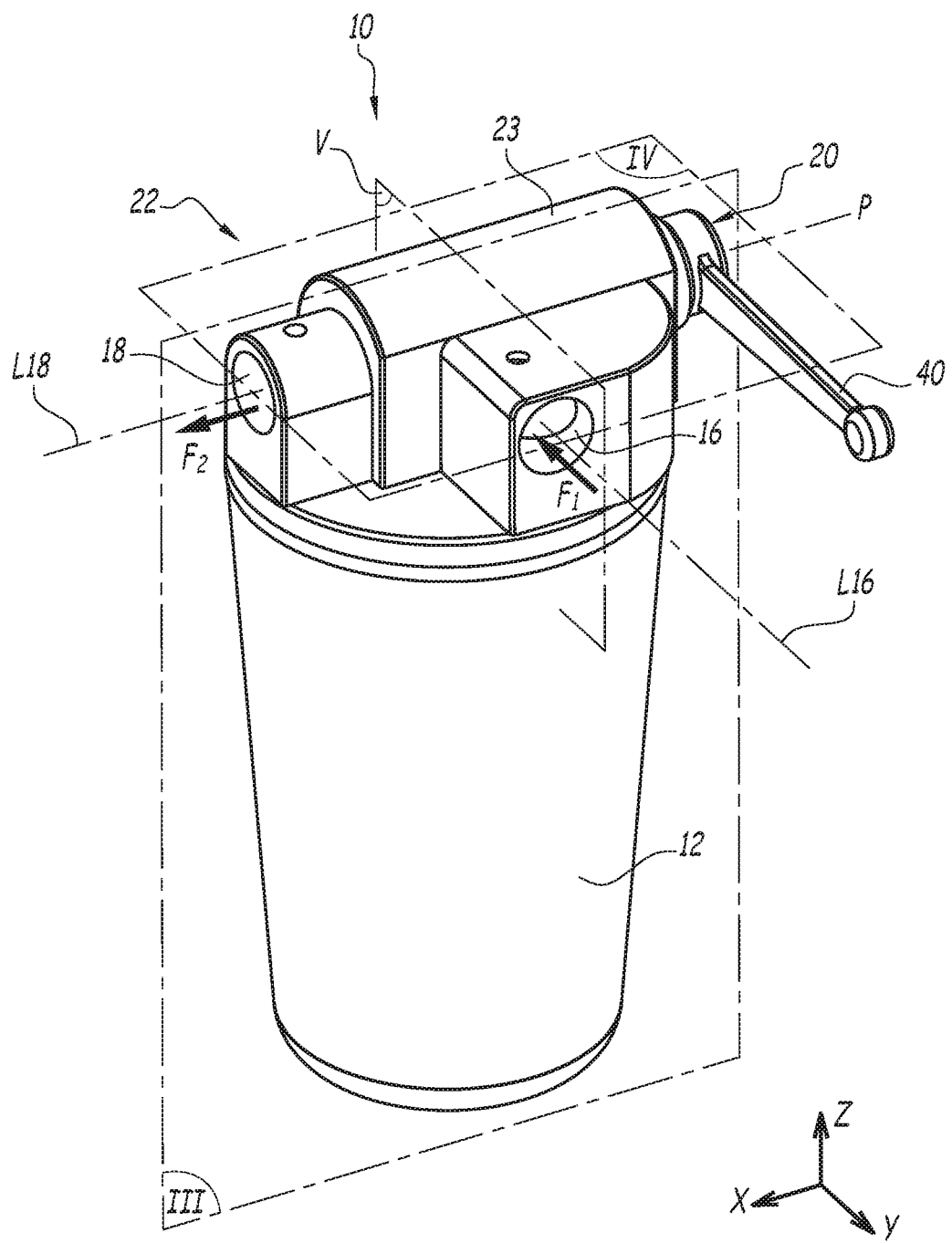
Figure 3:
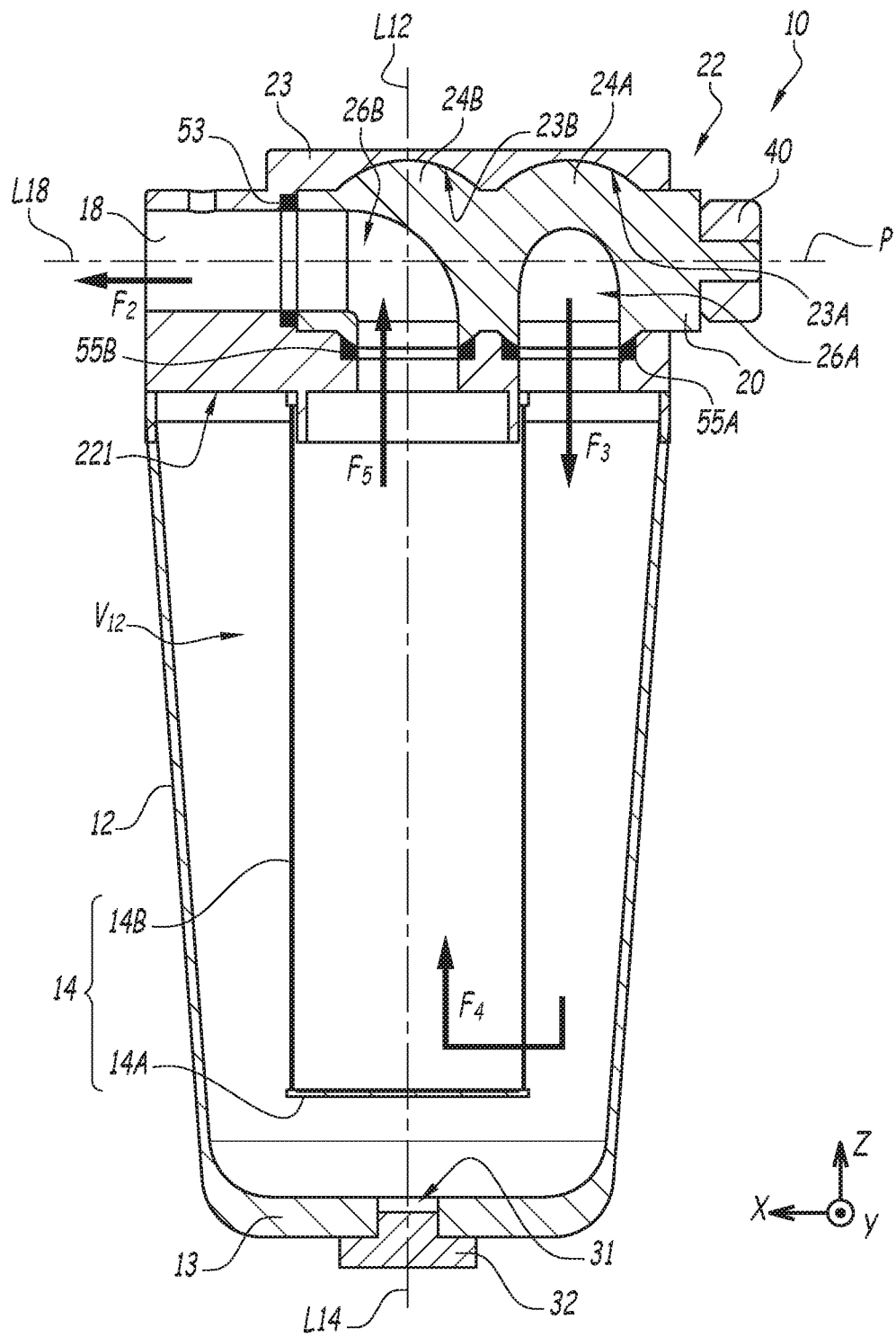
Figure 6:
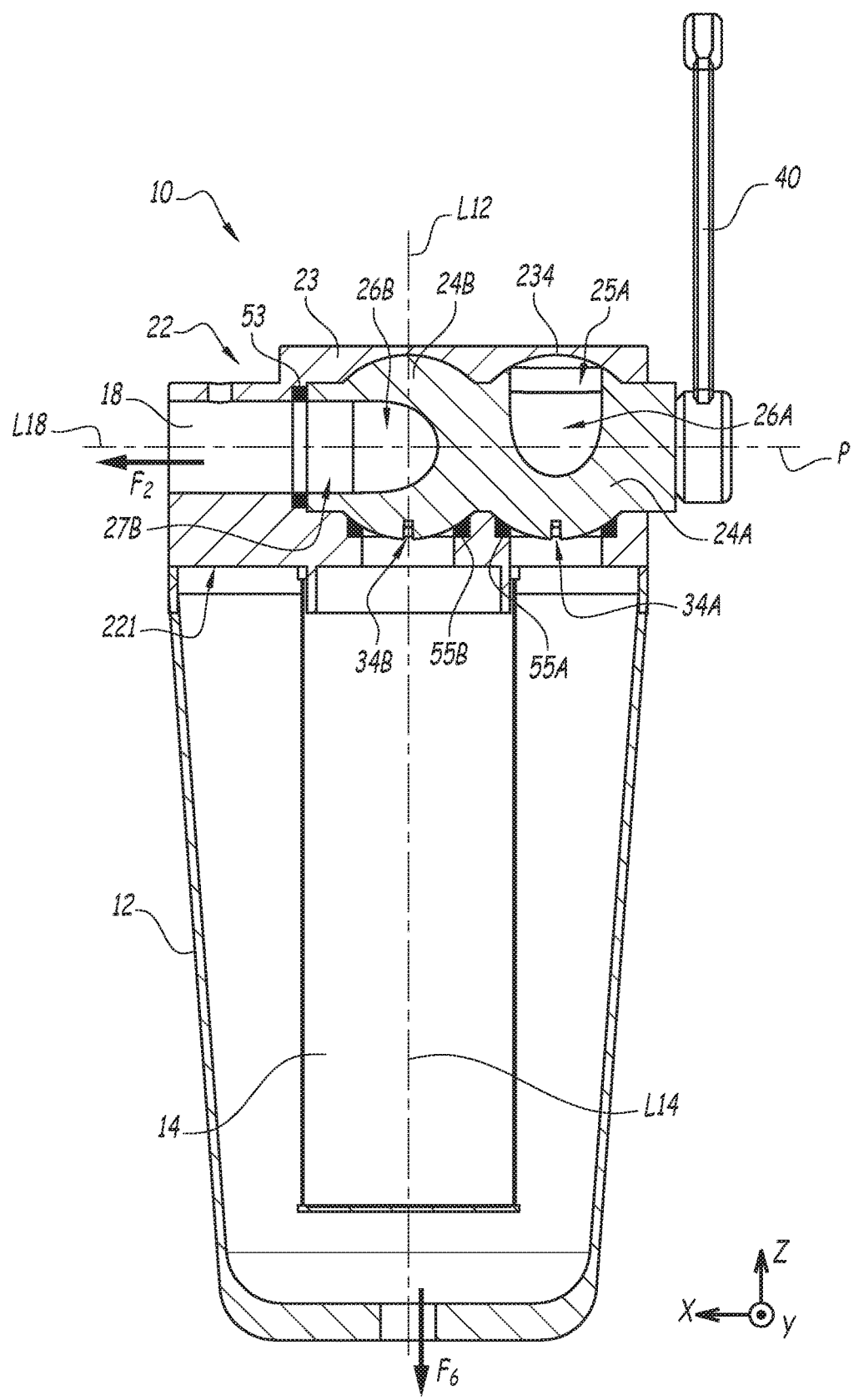
Figure 7:
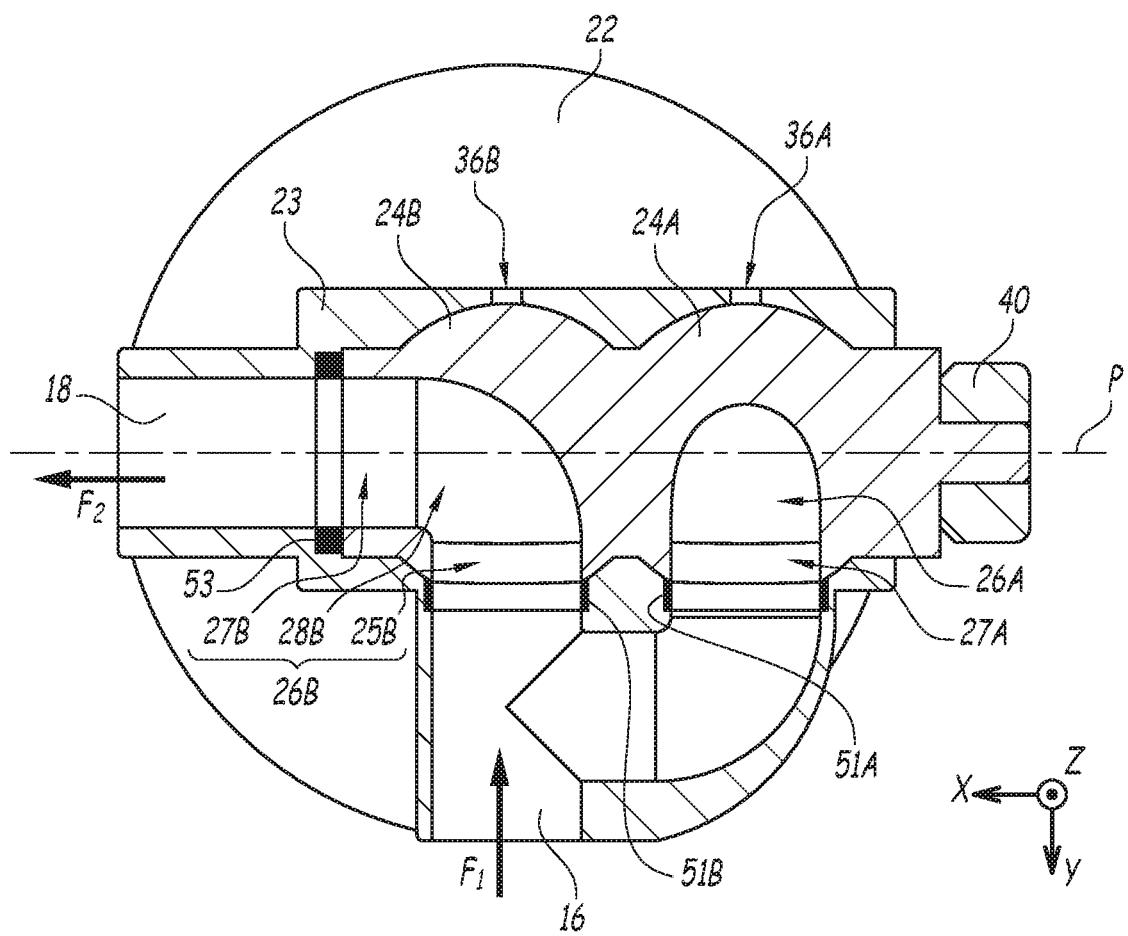

Bucket 12 has a symmetry of revolution around a longitudinal axis L12 of bucket 12. Filtering element 14 has a symmetry of revolution around a longitudinal axis L14 of this element. In FIGS. 3 and 6, longitudinal axes L12 and L14 are combined and parallel to axis Z. The longitudinal axes L12 and L14 are comprised in section plane III of FIG. 2.

In a variant, longitudinal axis L12 of bucket 12 and longitudinal axis L14 of filtering element 14 are not combined.

Bucket 12 includes a bottom 13 pierced with a bleed orifice 31, preferably coaxial with the longitudinal axis L12. When filtering element 14 is used to filter the liquid product, orifice 31 is closed off by a stopper 32 or another similar closing element.

Filter 10 further includes a liquid product intake tubing 16 suitable for being connected to portion 54, and a liquid product discharge tubing 18 suitable for being connected to portion 56. As shown in FIG. 2, tubings 16 and 18 have cylindrical sections, and longitudinal axes L16 and L18 of tubings 16 and 18 are respectively parallel to axes Y and X of the orthonormal coordinate system. Longitudinal axes L16 and L18 of tubings 16 and 18 are comprised in section plane IV of FIG. 2.

Valve 20 includes at least one spherical sliding gate. Valve 20 is rotatable, by pivoting the sliding gate around a pivot axis P parallel to axis X, pivot axis P corresponding to the intersection between planes III and IV of FIG. 2. Pivot axis P is defined by body 23 of valve 20, which, in practice, is made up of part of head 22.

In the example, axes L18 and P are combined. However, this is not mandatory.

In the embodiment of the invention shown in the figures and disclosed hereinafter, valve 20 includes two spherical sliding gates 24A and 24B that are secured to one another. Here, sliding gates 24A and 24B are formed by one monobloc part. Each spherical sliding gate 24A and 24B is a part with a spherical outer enclosure, partially hollowed out, like a loop pierced by a duct 26A or 26B emerging in two separate orifices specific to each sliding gate 24A or 24B. Ducts 26A and 26B are bent, preferably each forming a 90° angle, and have circular sections with diameters substantially equal to those of tubings 16 and 18.

In a variant, the diameters of ducts 26A and 26B are smaller than those of tubings 16 and 18.

In practice, bent ducts 26A and 26B each respectively includes two straight portions 25A, 27A and 25B, 27B and a respective right-angled bend 28A and 28B. Thus, first sliding gate 24A is passed through by duct 26A, formed by straight portions 25A and 27A coupled to one another by bend 28A. Furthermore, second sliding gate 24B is passed through by duct 26B, formed by straight portions 25B and 27B coupled to one another by bend 28B.

Body 23 delimits a housing accommodating sliding gates 24A and 24B of valve 20. The housing is formed by two spherical cavities 23A and 23B that emerge one in the other and each respectively accommodate a spherical sliding gate 24A or 24B. Tubings 16 and 18 are formed by body 23 of head 22. Cavity 23A accommodating first spherical sliding gate 24A is fluidly connected to intake tubing 16, while cavity 23B accommodating second spherical sliding gate 24B is fluidly connected to discharge tubing 18.

Filter 10 also includes at least one air intake orifice. In practice, filter 10 includes two air intake orifices 36A and 36B, arranged in a wall 232 of body 23, this wall being parallel to the plane formed by axes X and Z. Orifices 36A and 36B respectively emerge in cavities 23A and 23B, each opposite a spherical sliding gate 24A or 24B.

In a variant, the number of air intake orifices and/or their location can be different, as long as they perform their function, disclosed hereinafter.

Figure 8:
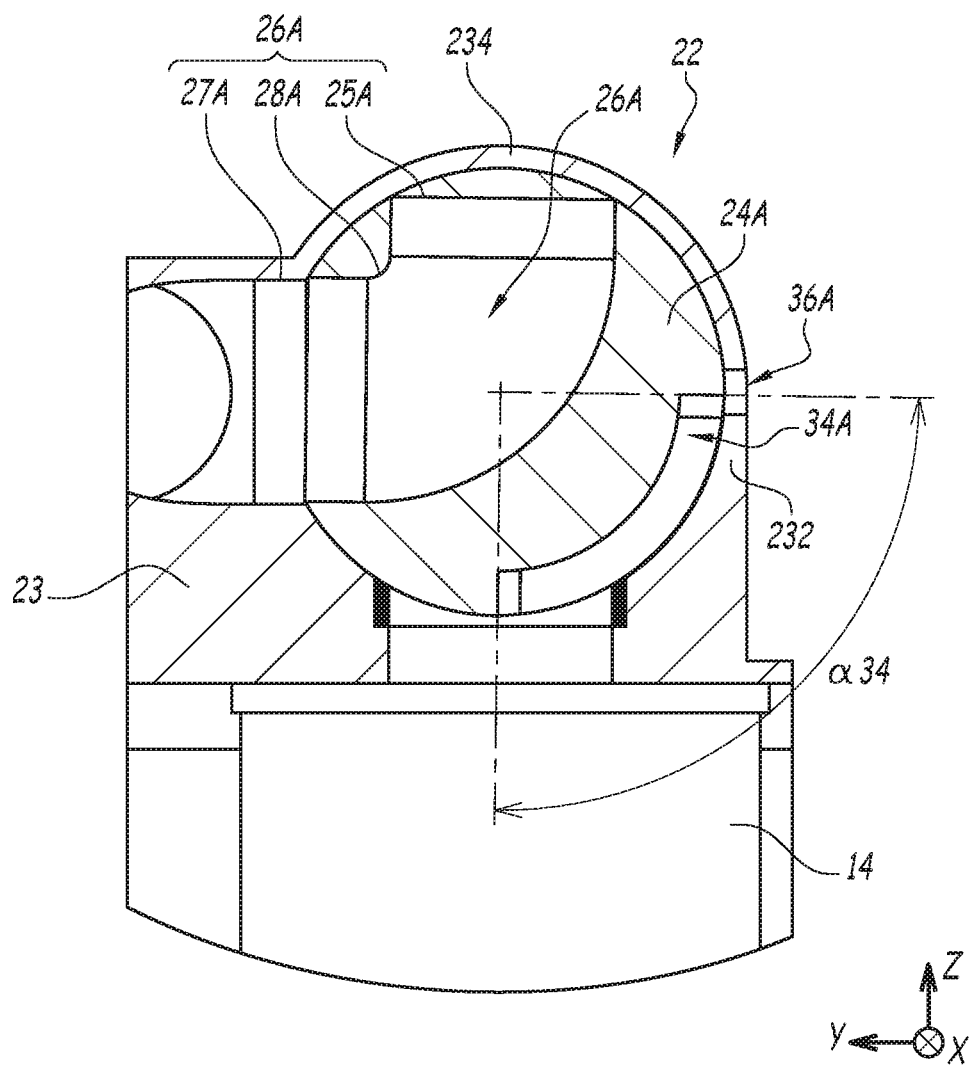

At least one of spherical sliding gates 24A or 24B is provided with a slot 34A or 34B for placing receiving volume V12 in communication with air intake orifice 36, which is adjacent to it, when valve 20 is in its second position, as shown in FIG. 8. Here, each sliding gate 24A and 24B includes a slot that is specific to it, slot 34A of sliding gate 24A being visible in FIGS. 5 and 8, while slots 34A and 34B are visible in FIG. 6. Slots 34A and 34B hollow out the surfaces of sliding gates 24A and 24B over a shallow depth, so as not to emerge in ducts 26A and 26B. Slots 34A and 34B are identical or practically identical to one another. The angle α34 defined between the ends of slot 34A and 34B, in a plane parallel to axes Y and Z and around the center of the sphere of sliding gate 24A or 24B in question, is 90°. In other words, each slot 34A and 34B extends over 90° at the surface of sliding gate 24A or 24B on which it is formed.

Sealing gaskets 51A and 51B are positioned in body 23 at junctions between intake tubing 16 and spherical sliding gates 24A and 24B. A sealing gasket 53 is positioned in body 23, at the junction between discharge tubing 18 and spherical sliding gate 24B. Sealing gaskets 55A and 55B are positioned in body 23 at junctions between volume V12 and sliding gates 24A and 24B. Gaskets 51A, 51B, 55A and 55B have a geometry suited to the spherical profile of sliding gates 24A and 24B.

The sealing gaskets are secured to body 23 of head 22; they are therefore not rotated during the pivoting of sliding gates 24A and 24B.

A manual control member, here formed by a lever 40, is secured, in rotation around pivot axis P, to first sliding gate 24A and makes it possible to actuate valve 20.

Valve 20 is configured to selectively assume two separate positions.

In its first position shown in FIGS. 1-5, valve 20 couples intake tubing 16 to receiving volume V12, through bent pipe 26A, and receiving volume V12 to discharge tubing 18, through bent pipe 26B. In its second position shown in FIGS. 6-8, valve 20 couples intake tubing 16 directly to discharge tubing 18, through bent pipe 26B. The second position of valve 20 makes it possible to isolate the receiving volume V12 from tubings 16 and 18. Thus, when valve 20 is in its second position, the liquid product circulates between intake tubing 16 and discharge tubing 18 without passing through bucket 12 or through filtering element 14, this configuration corresponding to the bypass.

Arrows F1 and F2 respectively indicate the directions and the sense of the flow entering filter 10 through intake tubing 16 and leaving it through discharge tubing 18.

In practice, a rotation with an amplitude equal to 90°, done by a manual actuation of lever 40, allows valve 20 to switch from its first position to its second position, and vice versa. Spherical sliding gates 24A and 24B being secured to one another, they are pivoted simultaneously around pivot axis P when lever 40 is actuated.

Figure 4:
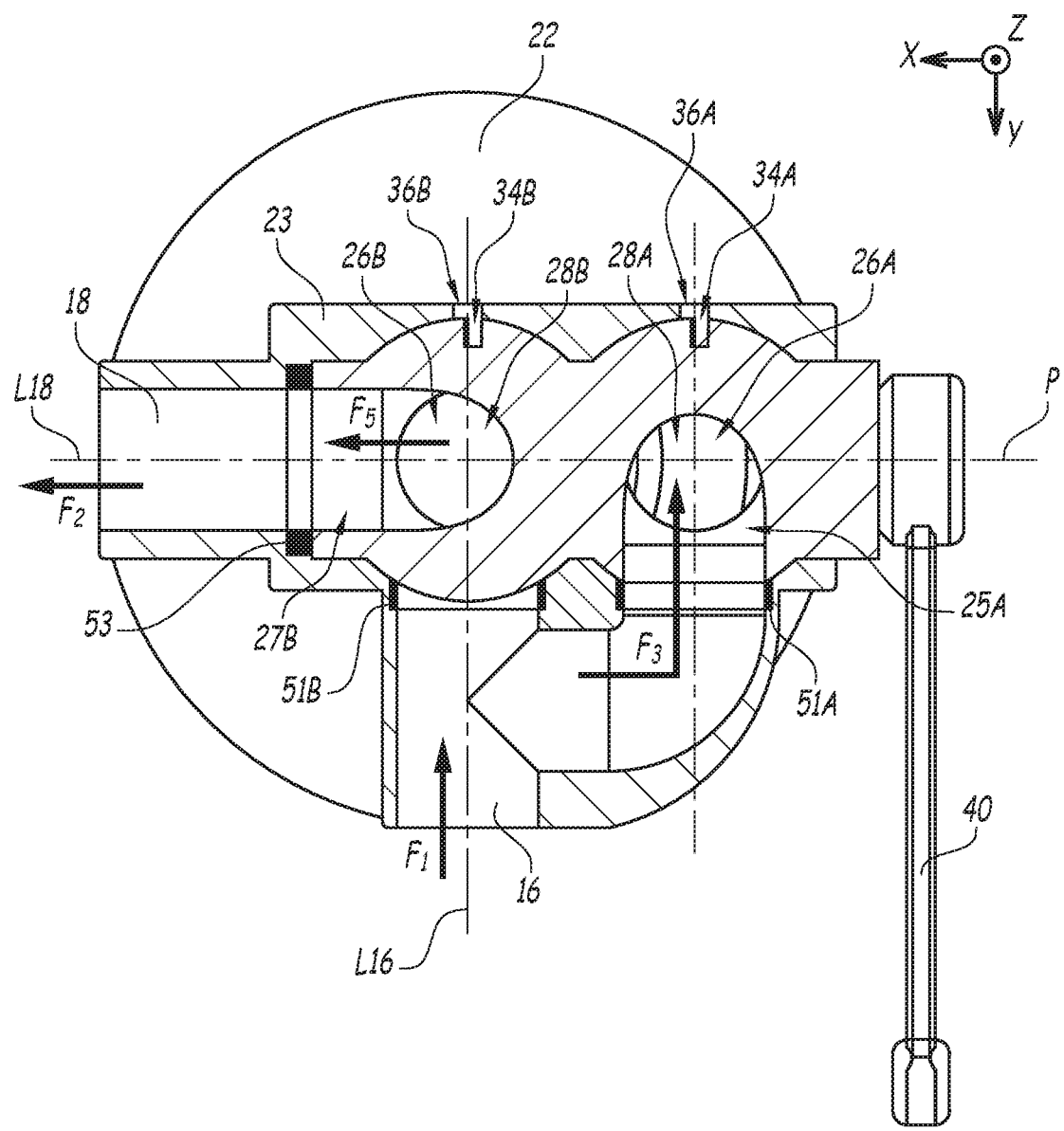
Figure 5:
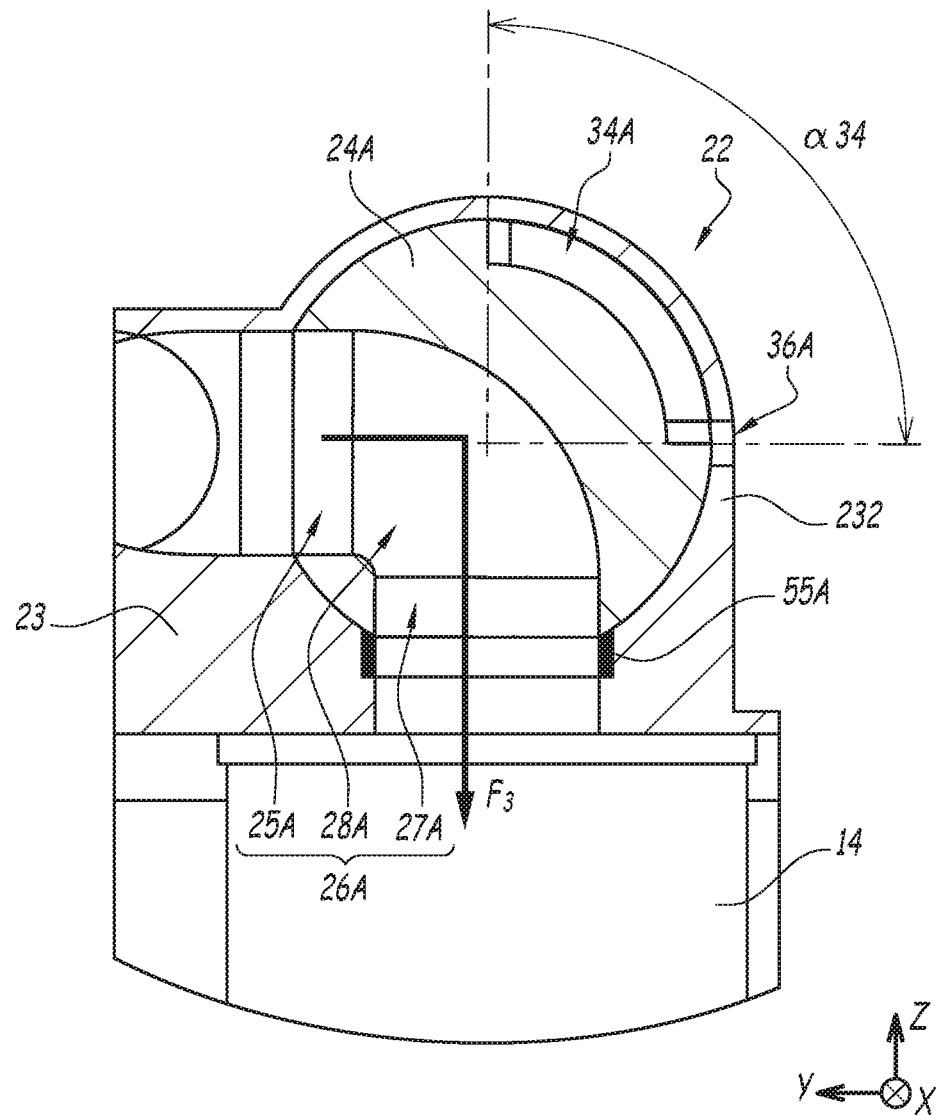

In the first position of valve 20, straight portion 25A is parallel to axis Y and coupled with intake tubing 16, straight portion 27A is parallel to axis Z, thus allowing the liquid product to flow to volume V12 of bucket 12, while following a path shown by arrows F1 and F3 in FIGS. 3-5. The product next passes through filtering element 14, as shown by arrow F4 in FIG. 3, then passes through second sliding gate 24B by following arrow F5 before being discharged through orifice 18 along arrow F2. Straight portion 25B is then parallel to axis Z and straight portion 27B is parallel to axis X and coupled with discharge tubing 18.

In the second position of the valve, straight portion 27A is parallel to axis Y and coupled with intake tubing 16, straight portion 25A is parallel to axis Z and positioned facing a wall 234 formed by body 23, on the side of head 22 opposite bucket 12. The liquid product that is located in duct 26A of first sliding gate 24A collides with wall 234, duct 26A therefore forming a dead line, as shown in FIG. 8. In order to be discharged from filter 10, the liquid product is forced to pass directly through duct 26B of second sliding gate 24B, by following arrows F1 and F2 in particular visible in FIG. 6. Straight portion 25B is here parallel to axis Y and coupled with intake tubing 16, straight portion 27B here is parallel to axis X and coupled with discharge tubing 18.

It will be noted that in both positions of valve 20, straight portion 27B is constantly parallel to axis X.

Advantageously, the position of lever 40 indicates the degree of opening or closing of inner sliding gate(s) 24A and 24B at head 22. When lever 40 is oriented along axis Y, therefore parallel to axis L16, valve 20 is in its first position, the liquid product then passing through duct 26A, in bucket 12 and through filtering element 14, before being discharged through orifice 18 by means of duct 26B of second sliding gate 24B. When lever 40 is oriented parallel to axis Z, therefore perpendicular to axis L16, valve 20 is in its position, the liquid product circulating in the bypass formed by bent duct 26B.

In this position, slots 34A and 34B create a passage between air intake orifices 36A and 36B and receiving volume V12, then making it possible to place the inside of bucket 12 at atmospheric pressure and to bleed filter 10 through bleed orifice 31 of bottom 13, after having removed stopper 32, which is shown by arrow F6 in FIG. 6.

Once bucket 12 is bled through orifice 31 and valve 20 remains in its second position, it is possible to separate bucket 12 from head 22, by deactivating the reversible assembly means that assemble them. It is then possible to remove bucket 22 from beneath head 22 and to access filtering element 14, which remains assembled below head 12, removably.

It is then possible to remove filtering element 14 from head 22 and to replace it, using a new filtering element. Bucket 12 may then be reassembled on head 12, around the new filtering element.

After having plugged orifice 31 again with button 32, valve 20 is switched back into its first position, which makes filter 10 operational again. Thus, filtering element 14 may be changed quickly and easily, without major disruption to the operation of installation 1.

Since ducts 26A and 26B are used in both positions of valve 20, they are constantly wetted by the liquid product. There is therefore no risk of deposits forming in these ducts, unlike a bypass pipe used occasionally. The filter change operation therefore takes place without showing any retention zone where the product would not be renewed and where it could therefore deteriorate.

According to a variant of the invention that is not shown, the intake tubing of filter 10 may be tubing 18, while the discharge tubing is tubing 16. This is, for example, the case for so-called "pocket" filters. The direction of arrows F1 to F5 is then reversed; arrows F1 and F2 are switched, as are arrows F3 and F5.

The invention is not limited to the case where the liquid product is a coating product. Filter 10 may be used in particular to filter an oil, for example for a motor, a cleaning product, water leaving a well, or a more viscous product such as glue, paste, sealing, anti-gravel or soundproofing putty.

Alternatively, valve 20 is motorized, in particular so as to be remotely controlled or robotic, which makes it possible to actuate the valve remotely.

In a variant, sliding gates 24A and 24B are cylindrical sliding gates.

According to a variant of the invention that is not shown, valve 20 includes a single cylindrical or spherical sliding gate, which is then advantageously multichannel.

Any feature of one of the embodiments or variants disclosed above can be implemented in the other disclosed embodiments and variants.

The invention claimed is:

1. A filter for a liquid or viscous product, this filter comprising:
   a filtering element;
   a bucket defining a receiving volume accommodating said filtering element;
   a liquid or viscous product intake tubing;
   a liquid or viscous product discharge tubing; and
   a valve configured to assume a first position where the valve couples said intake tubing to the receiving volume and this receiving volume to said discharge tubing, and a second position where the valve couples said intake tubing to said discharge tubing and isolates the receiving volume relative to the two tubings, wherein the valve comprises two cylindrical or two spherical sliding gates, namely:
   a first cylindrical or spherical sliding gate comprising a first duct which couples said intake tubing to the receiving volume, when the valve is in its first position, and which forms a dead line, when the valve is in its second position; and
   a second cylindrical or spherical sliding gate comprising a second duct which couples the receiving volume to said discharge tubing, when the valve is in its first position, and which couples said intake tubing to said discharge tubing, when the valve is in its second position.

2. The filter according to claim 1, wherein the filter comprises:
   at least one air intake orifice; and
   at least one purge orifice.

3. The filter according to claim 2, wherein at least one spherical sliding gate includes a slot for placing the receiving volume in communication with said at least one air intake orifice when said valve is in its second position.

4. The filter according to claim 1, comprising a member for manually controlling the position of said valve.

5. The filter according to claim 1, wherein said valve is movable between its first position and its second position, and reciprocally, by a rotation, around a pivot axis defined by a body of said valve.

6. The filter according to claim 5, wherein the amplitude of the rotation is 90°.

7. The filter according to claim 1, wherein said valve is integrated into a head mounted removably on said bucket.

8. The filter according to claim 7, wherein said filtering element is a cylindrical cartridge mounted removably on the head.

9. A spraying installation comprising:
   a tank of liquid or viscous product;
   a pump; and
   a sprayer; and
   a filter for liquid or viscous product according to claim 1.

* * * * *